Figure 1:
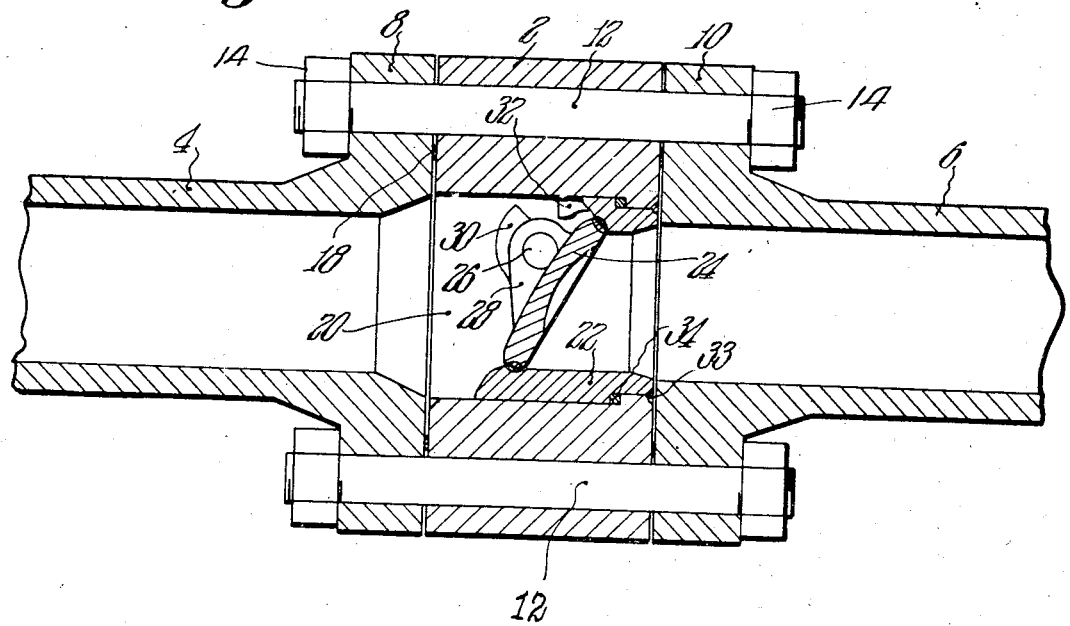

Dec. 30, 1941. G. E. SONDERMAN ET AL 2,268,518
VALVE STRUCTURE
Filed April 8, 1940

Patented Dec. 30, 1941

2,268,518

UNITED STATES PATENT OFFICE 2,268,518

VALVE STRUCTURE

Gerhard E. Sonderman, Port Washington, N. Y., Edward T. Davis, Mishawaka, Ind., and Edwin H. Krieg, Ridgewood, N. J., assignors to The Chapman Valve Manufacturing Co., Indian Orchard, Mass., a corporation of Massachusetts Application April 8, 1940, Serial No. 328,414

1 Claim. (Cl. 251—123)

This invention relates to improvements in pivoted disc or tilting disc valves adapted for use as check valves and the like and relates more particularly to improvements in valves of the type disclosed in United States Letters Patent #1,744,798 of January 28, 1930, to O. A. Price.

The principal objects of the invention are directed to the provision of a valve structure of the type referred to wherein a central body part including the co-operating valve parts is removable from the valve structure to facilitate repairing, reconditioning and/or replacement thereof.

Valves of the type herein referred to are frequently used as check valves in high pressure lines where the opposite ends of the valve are more or less permanently assembled in the line as by welding. According to this invention, a valve structure is provided wherein a central body including and having associated therewith the disc and seat members is removable from the structure as a unit thereby making it possible to replace the unit or its component parts or repair the same without the necessity of removing the entire valve structure from the pipe line.

It is well known that the seating surfaces of the co-acting surfaces of valves become worn, scored, injured and the valves are otherwise rendered unsuitable for service and that ordinarily the valves must be disconnected from the line for repairs, replacement, and the like.

According to this invention, not only is it unnecessary to remove the entire structure from the line but the novel features of construction of the valve make it possible when the central body part is removed to repair or recondition the parts and readjust or locate the valve seat relative to the pivotal connection of the disc member and body part to thereby compensate for wear or refinishing of the seat or seats. In this way the body part may be removed from the valve structure as a unit, the seating surface or surfaces may be reconditioned, and the body seat member may be adjusted to bring about proper seating of the disc and body and the parts reassembled thereby to insure proper functioning of the parts.

Figure 2:
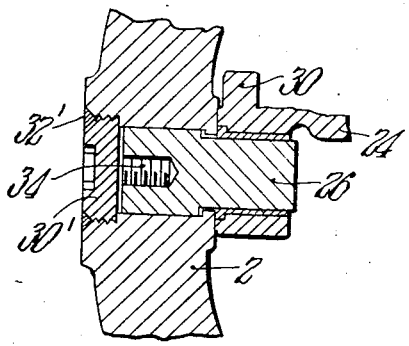

Various other novel objects and advantages of the invention will be hereinafter more fully referred to in connection with the accompanying description of the preferred form of the invention with reference to the drawing, wherein:

Fig. 1 is a longitudinal sectional elevational view through a valve structure embodying the novel features of the invention; and Fig. 2 is an enlarged partial transverse sectional elevational view showing one form of pivotal connection between the disc member and central body part of the valve structure shown in Fig. 1.

Referring to the drawing more in detail, the invention will now be fully described.

The valve structure of the invention includes in a general way a central body part 2 separable from the end members 4 and 6 which have passageways or bores therethrough. The members 4 and 6 or ends of members 4 and 6 are adapted to be secured in a pipe line by any suitable means. The said ends may carry flanges but for high pressure service they may be arranged for welding to adjacent ends of adjacent pipe sections.

The body portion 2 is disposed between flange portions 8 and 10 of the end members 4 and 6 and may be secured in place by any bolt arrangement desired. In the form of the invention shown there are a plurality of through or clamp bolts 12 extending through the parts which have nuts 14 on opposite ends thereof.

A packing 18 is shown between adjacent faces of the parts but it will be obvious that any desired other suitable packing arrangement may be employed in lieu thereof. The arangement will be such that the central body part may be removed from or inserted between the flanges 8 and 10 when the bolts 12 are removed.

In the form of the invention shown, the body part 2 has a seat ring member 22 in the bore 20 thereof. A disc member 24 is pivoted at its opposite sides as at 26 to the body part 2. The said disc member has a beveled face or seating surface which is engageable with a complemental face on the seat ring member 22. The angle of the seating surfaces and the location of the pivots relative thereto are such that the disc swings freely between open and closed positions as in the patent above referred to.

The disc 24 has ears or lugs 28 on opposite sides which are journalled on the pivots 26, the said pivots projecting inwardly from the wall of the body part 2. Screw members or plugs 30' close the bores in which the pivots 26 are located and said plugs may be welded at 32' to the member 2 if desired. The pivots 26 may be provided with tapped holes such as 34 for receiving threaded members to facilitate withdrawal of the said pivots when the plugs 30' are removed. It will be obvious that any other pivot arrangement desired may be employed in order to provide the pivotal action of the disc. The form of pivot construction shown is merely for illustrative purposes.

When in open position the valve disc assumes a more or less horizontal position and to more or less control that position co-acting stops 30 and 32 are provided on the disc and seat member 22 which may be arranged to limit the movement of the disc or to assure that it assume a desired or certain position when open.

The member 22 may be secured in the body 2 by welding as at 33 and a shim or shims indicated by 34 are disposed between shoulders of the body part 2 and member 22, as shown. This arrangement makes it possible to locate the member 22 axially of the bore 20 so that the co-acting seating surfaces of the disc 24 and member 22 are properly related or the seating surface of the member 22 is so located relative to the pivots that the disc and member co-act properly in seated relationship when the disc is in closed position.

The member 22 is insertable in and removable from the central body part 2, except for the welding which may be eliminated and the disc which may be removed by withdrawal of the pivots.

The member 22 and disc member 24 may have the seating surfaces formed thereon or there may be separate seat members provided and associated therewith, as shown.

With the valve structure installed in a pipe line, the central body part may, on removal of bolts 12, be removed from between the end members 4 and 6 without removing said members from the pipe line so that said central body part may be replaced by another one.

When the body part has been removed as a unit from between the end members the disc may be removed therefrom by withdrawing the pivots. This permits withdrawal of the member 22 when necessary and when the welding has been eliminated.

The occasion for withdrawing the central body part is usually because the unit as a whole or the parts thereof require replacing, reconditioning, or repairing. When the parts have been repaired or reconditioned the member 22 is positioned with relation to the pivots to provide the desired seating of the disc and member 22.

A shim or shims between the shoulders of the body and member 22 make it possible to locate member 22 so that its seat is located relative to the pivots to provide the desired co-action between the valve disc and member 22. In the location to best provide the seating co-action and maintained in that location by a shim or shims the member may be secured to the body by welding as indicated so that the body and associated parts may be reinserted between the members 4 and 6.

From the foregoing it will be noted that the central body member 2 may be inserted as a unit between or withdrawn from the end parts 4 and 6 without removing the entire valve structure from the pipe line. When the central body has been removed it may be disassembled for repair, replacement, or reconditioning of the parts which may be reassembled in such relative positions as to insure the desired and accurate seating of the disc and member.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

A high pressure check valve having an internally pivoted valve member comprising in combination, a body having parallel outer faces for insertion between adjacent parallel members of a pipe line provided with a main bore of relatively large and small diameters therethrough forming a shoulder, a seat ring member in said bore having a part forwardly of said shoulder and provided with a bore therethrough and a conical seat therearound at a side remote from said shoulder, a valve disc in the larger bore of said body having a bevelled peripherial edge complemental to said seat, fixed pivotal connections between opposite sides of said disc and said body independent of the seat ring member disposed upwardly from the larger diameter face of the disc and offset from the axis thereof, said pivotal connections including aligned pivot bores provided at opposite sides of the main bore in said body and lugs on said disc with pivot members associated with said lugs and bores, members in the outer ends of said bores, means for sealing the same in said bores, means between the shoulder in the bore of the body and seat ring member positioning the latter for alignment thereof with the disc and means securing the seat ring member in position against rotation.

GERHARD E. SONDERMAN.
EDWARD T. DAVIS.
EDWIN H. KRIEG.